Oct. 18, 1938.　　P. S. ROSENBERG　　2,133,575
PRESSURE RELIEF VALVE

Filed May 2, 1936

Inventor
Philip S. Rosenberg
By Blackmore, Spencer & Flint
Attorneys

Patented Oct. 18, 1938

2,133,575

UNITED STATES PATENT OFFICE 2,133,575

PRESSURE RELIEF VALVE

Philip S. Rosenberg, Lockport, N. Y., assignor to General Motors Corporation, Detroit, Mich., a corporation of Delaware Application May 2, 1936, Serial No. 77,489

4 Claims. (Cl. 277—45)

This invention relates to circulating liquid cooling systems for internal combustion engines and more particularly to an automatically controlled vent for a system to be operated under internal pressure.

It is an object of the present invention to provide in a closed system an improved valve structure which is characterized by simplicity, cheapness, reliability and carefree attention.

As is well understood, a closed system aids slightly to cooling efficiency and its use is currently in favor. Such systems incorporate relief valves for excess pressures and the problem has been to obtain a vent valve which is free of complications and gives satisfactory performance over a long period. With these things in mind there is contemplated a design having a minimum number of parts all easily manufactured and assembled at low cost. More particularly the novel structure in its preferred embodiment consists of a spring pressed valve associated with the usual overflow vent of the radiator assembly and made up of a sealing disc of resilient rubber and a backing plate therefor, the rim of the rubber disc being arranged for sealing engagement with an annular seat in the overflow pipe and the central portion being apertured and adapted for surface engagement with the backing plate to seal the aperture under internal pressure and for deflection from the plate to provide communication between the aperture and an opening in the backing plate under external pressure. Thus the rubber disc forms an effective seal against internal pressure as long as the valve is seated, the spring being calibrated or selected to allow the valve to open for the relief of pressure in excess of a predetermined value and the disc itself, by reason of its elasticity, yielding under influence of external pressure to avoid an internal sub-atmospheric pressure condition.

Figure 1:
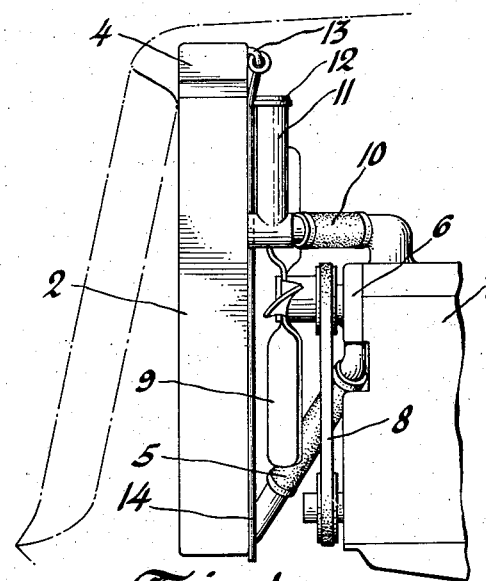
Figure 2:
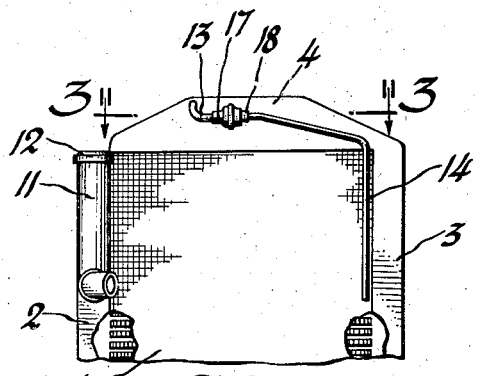
Figure 4:
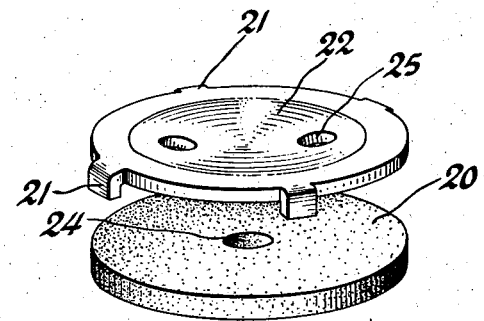
Figure 3:
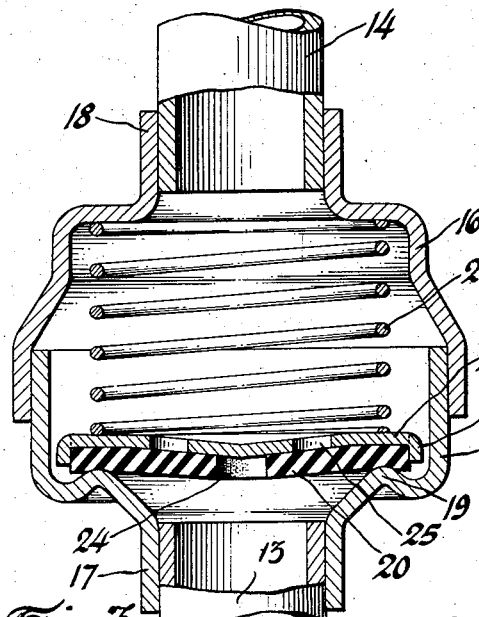
Figure 5:
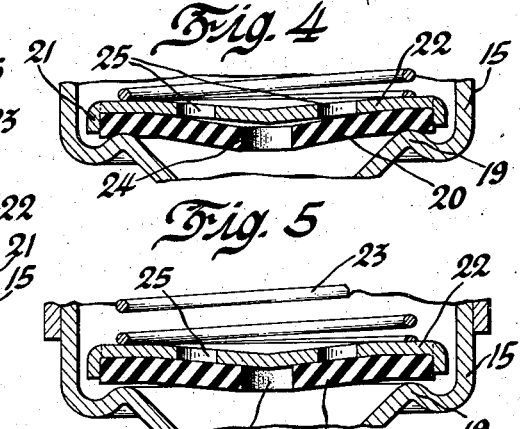
Figure 6:
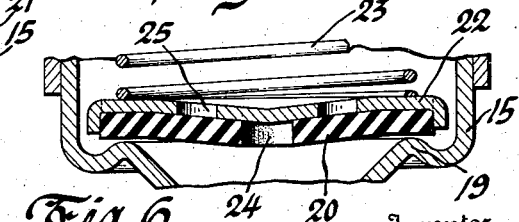
Figure 7:
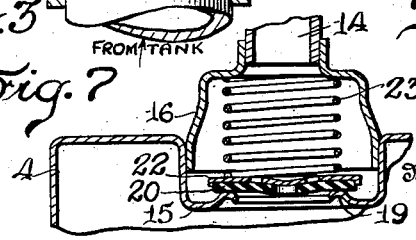

For a better explanation of the invention reference is made to the accompanying drawing wherein Figure 1 is a side elevation of an engine and cooling radiator assembly; Figure 2 shows a fragment of the radiator as viewed from the rear; Figure 3 is a section taken on line 3—3 of Figure 2; Figure 4 shows the valve elements in perspective; Figures 5 and 6 are sectional views illustrating different positions assumed by the valve elements, and Figure 7 is a sectional view showing a modification.

Referring to the drawing the numeral 1 indicates a heat exchanger unit or radiator core of the cross flow type having an inlet tank or header 2 on one side and an outlet header or tank 3 on the opposite side, there being associated with the outlet header 3 an expansion tank 4 which extends over and across the top of the core 1. At its lower end the outlet header 3 is provided with a suitable fitting for connection through the hose 5 with the suction side of an engine driven pump 6 on the front face of the jacketed engine block 7. Power from the engine is transmitted through the belt 8 to drive the pump 6 and also the radiator fan 9 and the cooling water after being circulated through the cylinder block and absorbing heat leaves the engine through the hose connection 10 and enters the inlet header 2 for passage across the core where its heat is absorbed by a stream of air drawn through the radiator by the engine driven fan 9.

Any suitable means may be provided for filling the system with cooling liquid, but for the sake of simplicity the drawing shows a standpipe or filler spout 11 associated with the inlet tank fitting and closed by a detachable cap 12. As will be evident from the drawing the top of the filler spout 11 terminates at the top of the radiator core and below the level of the expansion tank 4 and its height determines the maximum level to which the system may be filled. When the liquid heats up upon engine operation its volume expands and the excess water enters the expansion tank 4 for subsequent return to the circulating system when the liquid body contracts, thereby insuring system operation at full capacity at all times. If the system is completely closed to atmosphere the expansion of the liquid compresses the air within the top tank 4 and the higher pressure raises the boiling point of the liquid and increases its ability to transfer heat from the engine to the radiator. However, if the pressure is allowed to build up beyond a few pounds there would be the likelihood of the relatively fragile core bursting or of leakage through the hose connections and pump packings, and it is necessary, therefore, that a check be placed on the extent to which the pressure may go. For this purpose a pressure actuated valve can be associated with the usual overflow leading from the top of the expansion tank 4 for the automatic regulation of pressures.

According to the present invention, the overflow vent tube comprises two sections 13 and 14 with a suitable valve therebetween, the section 14 leading downwardly at one side of the radiator assembly for convenient discharge at the bottom thereof. The valve casing in this instance is formed of a pair of stampings 15 and 16 nested one within the other and having projecting from opposite ends tubular extensions 17 and 18 for sleeved connection with the adjacent ends of the pipe sections 13 and 14. Optionally the stamped cup 15 may be formed as an integral part of one wall of the expansion tank 4 by depressing a portion of the wall to cup shape as seen in Figure 7 to receive the stamping 16. Formed in the base of the cup 15 is an inwardly projecting rib 19 that provides an annular raised seat for a spring pressed valve.

The valve includes a disc 20 of rubber or other elastic deformable material secured within downturned tongues or flanges 21 of a relatively stiff backing plate 22 which may consist of a sheet metal stamping. A coil spring 23 of suitable preselected strength seats at one end against the base of the cup 16 and at the other end against the backing plate 22 to hold the rim of the rubber disc 20 in sealing contact with the annular seat 19 in opposition to internal pressures below the value of the spring resistance. When the internal pressure exceeds the resistance of the spring the valve is lifted from its seat as shown in Figure 6 for the relief of pressure until a balance is established.

When the liquid within the system contracts as a result of subsequent loss of heat, it is desirable that the internal pressure shall not fall below the external or atmospheric pressure. Advantage is here taken of the inherent elasticity of the rubber disc for establishing communication between opposite sides of the valve when the external pressure predominates. To this end, the center of the disc may be apertured as at 24 and the backing plate may be provided with one or more openings 25 arranged beyond or out of line with the central aperture 24 in the resilient disc. These openings are sealed from one another by the tight surface engagement of the disc 20 and plate 22, particularly when the valve is seated and the system is operating under internal pressure, inasmuch as the internal pressure tends to press the surfaces into closer engagement. As an additional safeguard in this connection the rubber disc 24 may be formed of initially flat material and the central portion of the plate 22 can be pressed inwardly to slight conical shape whereby upon assembly the rubber disc will be deformed slightly and be under a small initial tension.

Deflection of the rubber disc 24 will occur as seen in Figure 5 when internal pressure is below atmosphere, to provide communication between the openings 25 and 24 for the free flow of air from one side of the valve to the other until balanced relation is again established. Thus the cooling system will never be caused to operate under a condition of sub-atmospheric pressure but on the contrary pressure operation is insured from almost the very beginning when the cooling liquid is at an initial low temperature. This will be particularly advantageous when the cooling system is being operated on an antifreeze solution which normally has a relatively low boiling point since the operation under pressure reduces the likelihood of vaporization.

I claim:

1. In a pressure valve organization for an engine cooling system, a system vent including a centrally apertured cup-shaped depression in one wall of a system tank providing an annular skirt and an inturned flange, a raised rib in said flange about the central aperture for seating a valve, a cap fitted and sleeved to said skirt for cooperation with the depression in affording a valve chamber, a valve floating within the chamber and comprising an initially flat elastic disc and a stiff backing plate having a central conical portion stressing the disc to insure tight face to face contact between the disc and plate, a coil spring seated at opposite ends on the cap and the backing plate to seat the disc on the raised rib in said flange, said disc and plate having spaced openings adapted for communication upon deflection of the disc away from the plate, the opening in the disc being in alined relation with the apex of the conical portion of the plate.

2. In a pressure valve organization for an engine cooling system, a valve chamber comprising a pair of stamped metal cups nested together with reduced pipe connecting extensions at opposite ends thereof, an annular raised rib in the base of one of said cups, a valve spring housed within the chamber and seated at one end against the base of the other cup, a stiff conical plate seating the other end of said spring, an initially flat rubber disc carried by and stressed to conform with the plate to insure a close fit of the disc and plate and arranged to seat on said raised rib and cooperating ports in the plate and disc in out of line relation with the apex of the conical plate projecting into the port in the disc.

3. In a pressure valve organization for an engine cooling system having an overflow passage, a valve assembly adapted to be incorporated in said passage and including a pair of stamped cups having skirt portions telescopically sleeved together to provide a valve chamber, each cup having a centrally apertured base portion for providing communication between the chamber and the interior and exterior of the system, respectively, a raised annular valve seat about the aperture in the base of one of the cups, a distensible valve disc bearing near its periphery on said raised seat and having a central opening therethrough, a stiff backing plate of substantially conical shape having its apex projecting into the central opening of the disc and stressing the disc to conform thereto, said plate having an opening therethrough offset from said apex, and a coil spring bearing at one end on the backing plate in line with the raised valve seat and at its opposite end on the base of the other cup.

4. A double acting valve mechanism including a casing having a valve seat, an initially flat resilient member having a central opening and being adapted to seat near its periphery on said seat, a stiff backing plate having a central conical portion to engage and deform said member to substantially frusto-conical shape, with the apex of the conical portion projected into the central opening of said member for a stress fit to the circular edge thereof, said plate having an opening spaced from the apex thereof for communication with the central opening in said member upon additional member deformation, and a spring bearing on the plate and yielding to movement of the member away from said valve seat.

PHILIP S. ROSENBERG.